April 7, 1931.　　　　W. S. REED　　　　1,799,317
COUPLING
Filed July 13, 1929
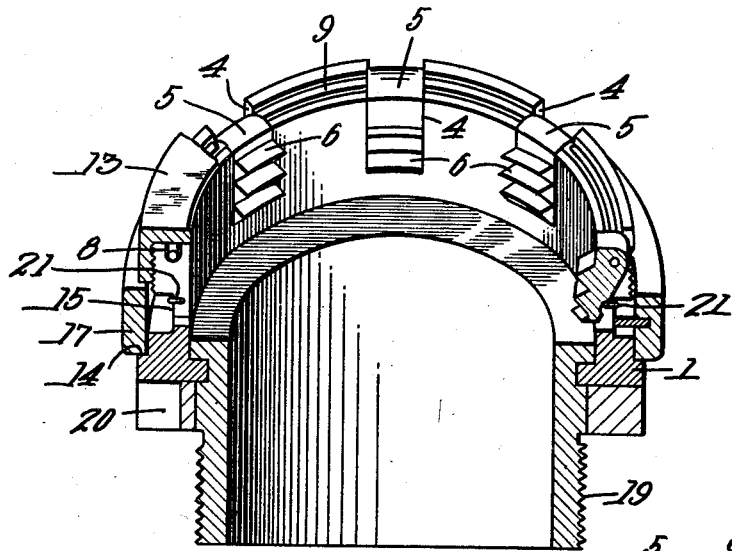
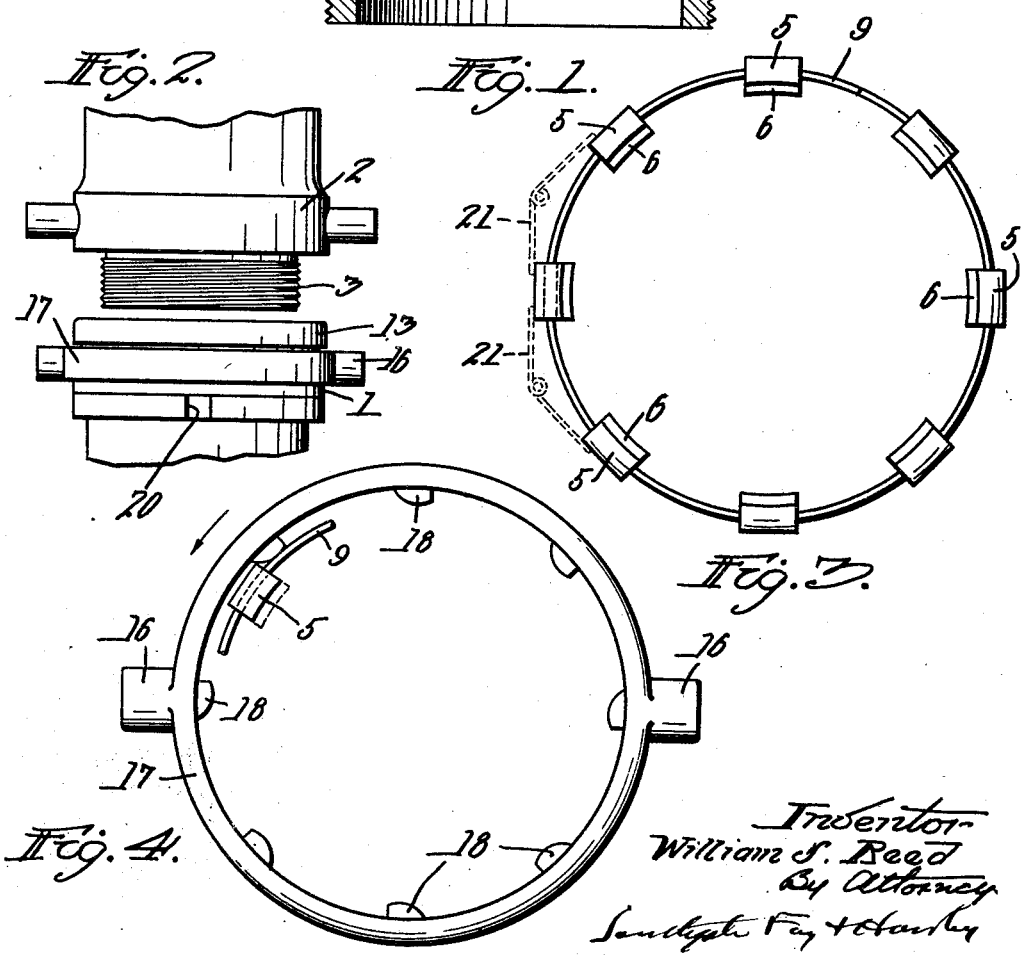
Inventor
William S. Reed
By Attorney Patented Apr. 7, 1931

1,799,317

UNITED STATES PATENT OFFICE

WILLIAM S. REED, OF LEOMINSTER, MASSACHUSETTS

COUPLING

Application filed July 13, 1929. Serial No. 378,114.

This invention relates to a hose coupling and constitutes an improvement over my Patent No. 910,416, January 19, 1909 and No. 1,540,281, June 2, 1925.

The coupling disclosed in said patents comprises a female member provided with swinging jaws, screw-threaded in the inside, so as to permit the two members of the coupling to be coupled quickly by merely inserting the male member into the female member longitudinally, and yet operating to prevent their accidental separation except by unscrewing.

The principal objects of this invention are to provide means whereby the screw-threaded jaws are pivotally mounted in such a way that, although they can be removed from the coupling, they cannot be separated from each other and therefore there will be no danger of getting them in again in the wrong position; to provide simple and effective means for positively holding the jaws locked in a position to prevent the removal of the other member of the coupling and to form the coupling in two pieces swivelled together for convenience in attaching.

Other objects and advantages of the invention will appear hereinafter.

Reference is to be had to the accompanying drawings in which

Fig. 1 is a sectional perspective view of a coupling member constructed in accordance with this invention;

Fig. 2 is a side view of this coupling member with the cooperating male member slightly separated therefrom;

Fig. 3 is a plan of the several threaded jaws and their connecting member removed from the coupling, and Fig. 4 is a plan of the slip-ring.

In the patents above mentioned the screw threaded jaw members were individually mounted. Obviously as they are separated from each other laterally and have parts of the same screw thread thereon, in order to fit the male coupling member, no two of them are alike. They have to be numbered and care has to be taken to introduce them in the proper position relative to each other around the coupling. As they are removable individually there is danger of their being misplaced and one substituted for another, which would entirely prevent the operation of the device.

One of the objects of this invention is to so connect these jaw members that although they can be removed they cannot be interchanged in position.

Another disadvantage of the former constructions was that the jaws were held out into contact with the screw members only by spring pressure. Therefore, if the threads got worn there might be a possibility of the other member, as for example, a hose nozzle, being pulled out of the coupling member. In order to avoid this, I provide a slip-ring having means for positively holding all the jaws inward, thus preventing the above mentioned possibility, even when the device is much worn.

The coupling member 1 is the part to which this invention is applied. The member 2 is the male member and may be a hose nozzle or the like. The coupling member 1 is provided as in my prior patents, with a cylindrical wall having a plurality of longitudinal parallel sided slots 4 in which are pivotally mounted dogs or jaws 5, having screw teeth 6, formed on their inner faces. These screw teeth form part of a continuous screw thread to fit the thread 3 on the coupling member 2. Therefore these dogs have to be arranged in a certain order around the coupling member 1.

For this purpose I provide the end of the coupling member 1 with a circular channel 8, continuous all the way around, and I provide a wire or endless holder 9 preferably in a complete circular form, on which the jaws 5 are all pivoted. They are arranged on this wire in the desired order and the ends of the wire are then preferably, but not necessarily, brought together and connected by welding, soldering or any other desired way so that it forms a complete circle. It will be seen that this wire will lie in the channel 8 and constitute the pivots for the several jaws, replacing the pivot studs 12 shown in the last named of the above patents. These jaws constitute a receding screw thread.

On account of this construction, these jaws 5 are all removable together and they can be laid aside as carelessly as may be and then, when put back, will have to be in the right order. There is no danger of losing one of them or replacing one in the place of another.

The coupling member 1 is provided with a cap 13, or closing ring which covers the top thereof and also the wire 9 in the channel 8 and is provided with a screw-threaded cylindrical section which enables it to screw on the end of this coupling member.

For the purpose of holding the pivoted jaws positively in an inner position, the coupling member 1 is provided with a shoulder 14 around it circumferentially and with a series of short circumferential recesses 15 beyond said shoulder at points near the slots 4. These recesses extend from a point just at one side of each slot 4 to a point considerably beyond the other side. On this shoulder is located a slip-ring 17 having a pair of knobs 16 extending therefrom radially by which it can be turned. The cap 13 holds the slip-ring in place and its edge may be considered as the top of a groove, of which the shoulder 14 constitutes the bottom, for holding the ring 17.

The actuating ring 17 is provided with a set of projecting cams 18, one for each of the recesses 15. Normally the cams 18 rest in the extensions of these recesses 15. When it is desired to hold the jaws 5 positively in locked position after the male member is inserted in place, this ring is turned so as to bring the cam surfaces out into contact with the backs of these jaws and hold them positively in the position in which they are located so that when the nozzle is turned partly around it will not become displaced when the operator lets go of it to get another hold. This ring can be used to throw the jaws in even without using any springs, but the jaws are shown as being forced in yieldingly by springs 21.

At the bottom, the threaded end 19 of the coupling member 1, instead of being made integral with the rest of the member, is swiveled to it to permit turning it without turning the rest of the coupling member and it has a pair of depressions 20, shown as placed opposite each other for the application of a spanner or wrench to manipulate it. By having depressions instead of projections there is no interference with the knobs 16 on the slip-ring.

In the use of the device it is manipulated in the same way as my above mentioned patents except that the slip-ring is an additional feature and the swiveling also. By this construction the jaws are prevented from being misplaced relative to each other, they can be held out positively to prevent the accidental displacement of the male member of the coupling and the screw-threaded end of the female member being rotatable, the connection of the coupling with a pipe is simplified.

Although I have illustrated and described only one form of the invention I am aware of the fact that modifications can be made therein by any person skilled in the art without departing from the scope of the invention as expressed in the claims.

Therefore I do not wish to be limited in this respect but what I do claim is:—

1. A coupling member comprising a circular body provided with slots in its wall, a holding member on said walls, jaws located in said slots and pivoted on said member, the holding member with the several jaws being removable and replaceable without displacing the jaws relative to each other, the jaws being provided with parts of the same screw-thread on their inner surfaces, for the purpose described.

2. A coupling member comprising a circular body provided with slots in its wall, a wire ring on said walls, jaws located in said slots and pivoted on said wire, whereby the wire with the several jaws can be removed and replaced without displacing the jaws relative to each other, said slots being open at the top to permit of such removal and the jaws being provided with parts of the same screw-thread on their inner surfaces, for the purpose described.

3. A coupling member comprising a circular body provided with open ended slots in its walls and provided with a channel at its end extending entirely around it, a ring resting in said channel, a series of jaws located in said slots each having a passage therethrough near the end through which said ring passes so that the jaws are pivoted on said ring, springs behind said jaws to force them inwardly and permit them to yield and swing back into the slots, said jaws having teeth adapted to fit a male screw thread, said ring being removable from said channel with the jaws thereon, and a cover plate attached by screw threads at the end of the coupling member and projecting over the channel.

In testimony whereof I have hereunto affixed my signature.

WILLIAM S. REED.